B. Y. CONKLIN.

BLACKBOARD AND OTHER RUBBERS.

No. 6,797. Reissued Dec. 14, 1875.

Fig. 1.

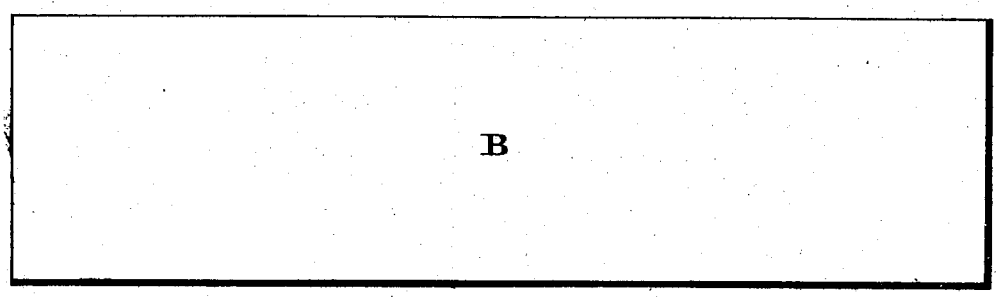

Fig. 2.

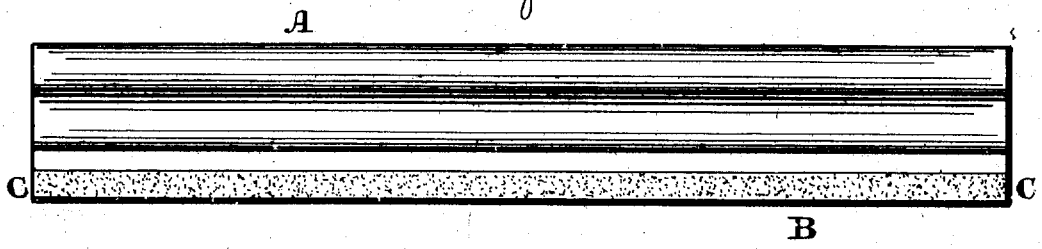

Fig. 3.

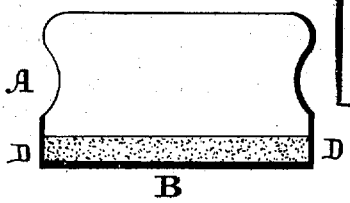

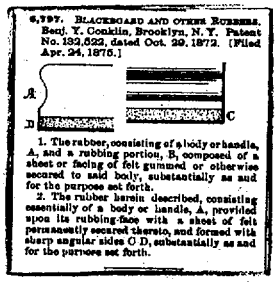

6,797. BLACKBOARD AND OTHER RUBBERS. Benj. Y. Conklin, Brooklyn, N. Y. Patent No. 132,522, dated Oct. 29, 1872. [Filed Apr. 24, 1875.]

A D C

1. The rubber, consisting of a body or handle, A, and a rubbing portion, B, composed of a sheet or facing of felt gummed or otherwise secured to said body, substantially as and for the purpose set forth.

2. The rubber herein described, consisting essentially of a body or handle, A, provided upon its rubbing-face with a sheet of felt permanently secured thereto, and formed with sharp angular sides C D, substantially as and for the purpose set forth.

Witnesses:

L. F. Brous,

A. P. Grant.

Inventor:

Benjamin Y. Conklin by John Wiedenhofer

Atty.

UNITED STATES PATENT OFFICE.

BENJAMIN Y. CONKLIN, OF BROOKLYN, NEW YORK.

IMPROVEMENT IN BLACKBOARD AND OTHER RUBBERS.

Specification forming part of Letters Patent No. 132,522, dated October 29, 1872; reissue No. 6,797, dated December 14, 1875; application filed April 24, 1875.

*To all whom it may concern:*

Be it known that I, BENJAMIN Y. CONKLIN, of Brooklyn, in the county of Kings and the State of New York, have invented a new and useful Improvement in Rubbers or Brushes; and I do hereby declare the following to be a clear and exact description of the nature thereof, sufficient to enable others skilled in the art to which my invention appertains to fully understand, make, and use the same, reference being had to the accompanying drawings, making part of this specification, in which—

Figure 1 is a bottom view of the device embodying my invention. Fig. 2 is a side view thereof. Fig. 3 is an end view thereof.

Similar letters of reference indicate like parts in the several figures.

My invention relates to a rubber or brush for the removal of dust and marks; and it consists of strips of felt gummed, glued, or equivalently permanently secured to a back or handle.

Referring to the drawings, A represents the back or handle of the rubber or brush; and it consists of a block of wood or other material, which may be of quadrilateral form. The sides C D of the sheet A are made angular or sharp, whereby every part of the article to be cleansed or rubbed may be conveniently reached. To one face of this back I attach, by gumming or gluing, the rubber B, which consists of a strip of the article of manufacture well known as felt.

Felt, combined as above stated, possesses the following advantages: The surface, when gummed, adheres most firmly to the back A, so that tacks, nails, and other fastenings are not required, and, consequently, there is no liability of scratching or cutting the article to be rubbed or brushed. The nature of the material is such that it will not ravel and fray, and thus loosening or tearing from the back will not occur. Felt can be made of considerable thickness, and may, therefore, be cut into sheets having a flat face, and sharp and angular edges, whereby every part of the article to be cleansed can be reached. Dust and dirt can be removed. Glass may be rubbed clean of smut, streaks, &c. Lines and marks large and small can be obliterated. The felt is a ready polisher and is not harsh. It possesses softness and flexibility, so as to avoid scratching, streaking, &c., yet it is sufficiently firm and durable. Moreover, felt "takes up" or absorbs dust, and similar substances, and thus the latter is "held" until the work is finished. Then, by a few sharp blows or knocks of one brush against another the dust is liberated, and the brush again cleansed.

I am aware that sheep and chamois skins and similar articles have been employed for the purposes of brushes, but they do not possess features and advantages hereinbefore specified.

Having thus described my invention, what I claim as new, and desire to secure by Letters Patent, is—

1. The rubber, consisting of a body or handle, A, and a rubbing portion, B, composed of a sheet or facing of felt gummed or otherwise secured to said body, substantially as and for the purpose set forth.

2. The rubber herein described, consisting essentially of a body or handle, A, provided upon its rubbing-face with a sheet of felt permanently secured thereto, and formed with sharp angular sides C D, substantially as and for the purpose set forth.

BENJAMIN Y. CONKLIN.

Witnesses:

SAMUEL FROST,

MARQUIS C. FROST.